United States Patent [19]

Takeda et al.

[11] 4,074,226
[45] Feb. 14, 1978

[54] BRAKE MALFUNCTION WARNING AND INDICATING SYSTEM FOR AUTOMOBILES

[75] Inventors: Nobuhiro Takeda; Masaichi Hattori; Minoru Kondo, all of Nagoya; Tatsuo Kato, Inazawa, all of Japan

[73] Assignee: Kabushiki Kaisha Tokai Rika Denki Seisakusho, Japan

[21] Appl. No.: 663,857

[22] Filed: Mar. 4, 1976

Related U.S. Application Data

[63] Continuation of Ser. No. 597,995, July 22, 1975, abandoned, which is a continuation of Ser. No. 387,643, Aug. 13, 1973, abandoned.

[30] Foreign Application Priority Data

Aug. 15, 1972 Japan .................................. 47-81132
Aug. 25, 1972 Japan .................................. 47-85061
July 25, 1973 Japan .................................. 48-87313

[51] Int. Cl.² .......................... G08B 21/00; B60Q 1/00
[52] U.S. Cl. ............................... 340/52 B; 180/82 R; 188/1 A; 340/60
[58] Field of Search .................... 340/52 B, 52 C, 69, 340/60, 240; 200/81.4; 188/1 A, 151 A; 180/82 R; 73/39

[56] References Cited

U.S. PATENT DOCUMENTS

| | | | |
|---|---|---|---|
| 3,421,322 | 1/1969 | Reznicek | 340/52 C |
| 3,500,311 | 3/1970 | Bishop | 200/81.4 |
| 3,509,528 | 4/1970 | Wiley | 340/60 |
| 3,810,087 | 5/1974 | Suzuki | 340/52 B |
| 3,828,308 | 8/1974 | Kobayashi | 340/52 C |

*Primary Examiner*—John W. Caldwell, Sr.
*Assistant Examiner*—Joseph E. Nowicki

[57] ABSTRACT

A brake malfunction warning and indicating system for use with a brake system of an automotive vehicle, comprising a brake warning switch rendered conductive when a brake pedal is depressed with the braking oil pressure being at an abnormal level and also when the brake pedal is released, a self-maintaining circuit connected to said brake warning switch and rendered conductive, only when said brake warning switch is conductive, for self-maintaining its conductive condition, and an indicating circuit connected to said self-maintaining circuit and rendered conductive, when said self-maintaining circuit is conductive, for turning on a brake malfunction indicating lamp. Thus, the indicating lamp will continue lighting, while the braking oil pressure is at an abnormal level, until it is restored to a normal level.

1 Claim, 4 Drawing Figures

BRAKE MALFUNCTION WARNING AND INDICATING SYSTEM FOR AUTOMOBILES

This is a continuation, of application Ser. No. 597,995, filed July 22, 1975, which is a continuation of Application Ser. No. 387,643, filed Aug. 13, 1973, both abandoned.

BACKGROUND OF THE INVENTION

1. Field of the Invention

The present invention relates to a brake malfunction warning and indicating system for use with an automotive brake system.

2. Description of the Prior Art

In the last decade, the number of automobile vehicles has increased quite steadily so that the roads have highly dense traffic. As a result, the casualties due to traffic accidents have also increased accordingly. This requires that automotive vehicles be equipped with double or triple safeguards. As to the brake system, for example, most of the present automotive vehicles adopt a dual brake system. Thus, even when one brake system becomes inoperative by some cause, the other system will perform the braking action, thereby to prevent a traffic accident resulting from the brake malfunction which might otherwise be encountered. Even in this instance, however, the dual system brake will experience the so-called "unbalanced braking phenomenon" when one brake system becomes inoperative. When an unbalanced braking force is imparted to an automotive vehicle running at a high speed, the vehicle can often be subjected to a traffic accident. This unbalance will not, however, occur when the vehicle is running at a normal cruising speed.

SUMMARY OF THE INVENTION

It is, therefore, an object of the present invention to provide a brake malfunction warning and indicating system which is capable of detecting and indicating a brake malfunction when at least one brake system of the dual system brake gets out of order.

Another object of the present invention is to provide a brake malfunction warning and indicating system which is capable of memorizing a possible malfunction of a hydraulic circuit of the dual system brake, even when it is deenergized, and indicating the malfunction simultaneously upon its energization.

A further object of the present invention is to provide a highly reliable brake malfunction warning and indicating system including a simplified and inexpensive electronic circuit which is operative to self-maintain a command signal for indication of the brake malfunction.

BRIEF SUMMARY OF THE INVENTION

According to the present invention, there is provided a brake malfunction warning and indicating system for use with a brake system of an automotive vehicle, comprising a stop switch rendered conductive in response to depression of a brake pedal; a brake warning switch normally conductive when the brake pedal is released, and rendered nonconductive when the brake pedal is depressed and the pressure of the working fluid in the brake system is at a normal level, said brake warning switch being rendered conductive in response to a possible malfunction of the brake system in terms of the working fluid when the brake pedal is depressed; a self-maintaining circuit connected between the anode of a power source and said brake warning switch and including switching means which is operative when said stop switch and said brake warning switch are rendered conductive and kept operative till said brake warning switch is rendered nonconductive; and a brake malfunction indicating lamp connected to said self-maintaining circuit and adapted to be energized upon the operation of said switching means of the self-maintaining circuit.

BRIEF DESCRIPTION OF THE DRAWINGS

Other objects and advantages of the present invention will be apparent from the following description taken in conjunction with the accompanying drawings, in which.

DESCRIPTION OF THE PREFERRED EMBODIMENTS

Figure 1:
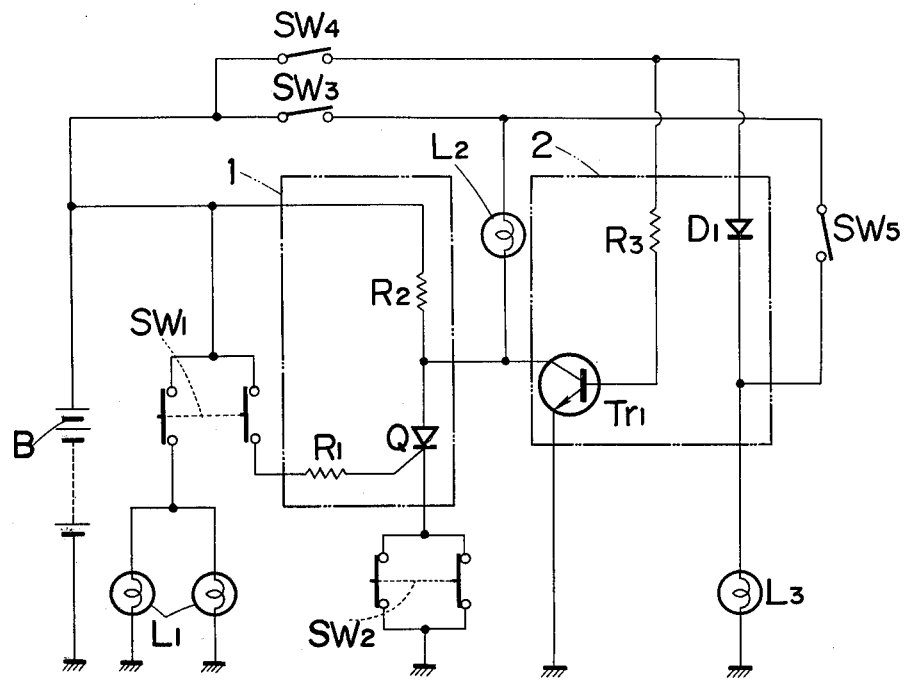
FIG. 1 is a connecting diagram showing a brake malfunction warning and indicating system according to the present invention.
Figure 2:
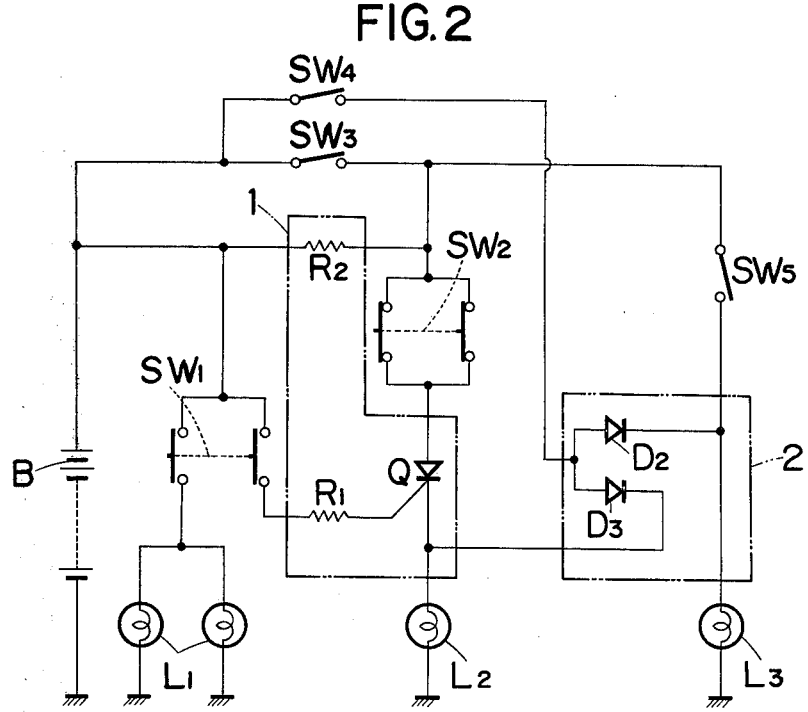
FIG. 2 is similar to FIG. 1 but shows another embodiment of the present invention.

One mode of a brake malfunction warning and indicating system according to the present invention will be described with reference to FIGS. 1 and 2. Reference letter B indicates a power source such as a battery mounted on an automotive vehicle. Letters $SW_1$ and $SW_2$ respectively indicate a two-way stop switch rendered conductive by the mechanical displacement of a brake pedal of the automotive vehicle, and a two-way brake warning switch which is always conductive when the brake pedal is released and which is rendered nonconductive when the brake pedal is depressed and the oil pressure in the hydraulic circuit in the brake system is at a normal level. The brake warning switch $SW_2$ is maintained conductive when the oil pressure is at an abnormal level even with the brake pedal being depressed. Letters $SW_3$, $SW_4$ and $SW_5$ respectively indicate an ignition switch, a starter switch and a parking switch. Letters $L_1$, $L_2$ and $L_3$ respectively indicate a stop lamp, a brake malfunction indicating lamp and a parking lamp. Generally indicated at reference numeral 1 is a self-maintaining circuit which includes a controlled rectifying element Q such as a silicon controlled rectifier (which will be shortly referred to as SCR), a gate bias resistor $R_1$ and a resistor $R_2$ for supplying a maintaining current to the SCR. All of these elements are common to the two embodiments of FIGS. 1 and 2. As shown in FIG. 1, on the other hand, reference numeral 2 indicates a check circuit which includes a transistor $Tr_1$, a base bias resistor $R_3$ and a diode $D_1$. In the embodiment of FIG. 2, however, the check circuit 2 includes two diodes $D_2$ and $D_3$.

The operations of the two embodiments will now be described with reference to FIGS. 1 and 2.

In the embodiment of FIG. 1, when the ignition switch $SW_3$ and the starter switch $SW_4$ are closed to start an engine of the automotive vehicle under discussion, then a base current is supplied to the base of the transistor $Tr_1$ of the check circuit 2 through the resistor $R_3$, so that the transistor $Tr_1$ is rendered conductive. As a result, a circuit composed of the power source B, the ignition switch $SW_3$, the brake malfunction indicating lamp $L_2$, the collector and emitter of the transistor $Tr_1$ and the ground is made to light the brake malfunction indicating lamp $L_2$. At the same time, another circuit composed of the power source B, the starter switch $SW_4$, the diode $D_1$, the parking lamp $L_3$ and the ground is also made to light the parking lamp $L_3$.

In the embodiment of FIG. 2, on the other hand, while the starter switch $SW_4$ is kept conductive, a circuit composed of the power source B, the diodes $D_2$ and $D_3$, the brake malfunction indicating lamp $L_2$ and the parking lamp $L_3$ is made to light the two lamps $L_2$ and $L_3$. These lamps $L_2$ and $L_3$ are turned off when the engine is started to render the starter switch $SW_4$ nonconductive. This implies that it is possible to check the existence of disconnection of the brake malfunction indicating lamp $L_2$ and the parking lamp $L_3$ during the starting operation in which the starter switch $SW_4$ is condictive.

In both of the embodiments of FIGS. 1 and 2, when the parking switch $SW_5$ is closed with the ignition switch $SW_3$ being condictive, a circuit including the power source B, the ignition switch $SW_3$, the parking switch $SW_5$, the parking lamp $L_3$ and the ground is made to turn on the parking lamp $L_3$.

Now, description will follow on the operation of the present brake malfunction warning and indicating system in the case where the brake pedal is depressed to closed the stop switch $SW_1$ when the vehicle is running.

If it is assumed that the braking oil pressure is at a normal level, the brake warning switch $SW_2$ is rendered nonconductive when the brake pedal is depressed. Even if, in this instance, an electric current is supplied to the gate of the SCR of the self-maintaining circuit 2 via the stop switch $SW_1$ and the resistor $R_1$, the cathode of the SCR is electrically isolated from the ground in the embodiment of FIG. 1 and the anode of the SCR is isolated from the anode of the power source B in the embodiment of FIG. 2. As a result, the SCR is maintained nonconductive to prevent lighting of the brake malfunction indicating lamp $L_2$. In view of this, the driver can judge that the braking oil pressure is at a normal level. Here, the stop lamp $L_1$ is turned on by closing the stop switch $SW_1$.

When, on the contrary, the braking oil pressure is at an abnormal level, then the brake warning switch $SW_2$ is maintained conductive when the brake pedal is depressed. Since the stop switch $SW_1$ is also rendered conductive simultaneously, a gate current is supplied to the SCR via the resistor $R_1$ so that the SCR is rendered conductive. As a result, in the embodiment of FIG. 1, a circuit including the power source B, the ignition switch $SW_3$, the brake malfunction indicating lamp $L_2$, the SCR, the brake warning switch $SW_2$ and the ground is closed to turn on the brake malfunction indicating lamp $L_2$. In the embodiment of FIG. 2, on the other hand, a circuit including the power source B, the ignition switch $SW_3$, the brake warning switch $SW_2$, the SCR, the brake malfunction indicating lamp $L_2$ and the ground is made to turn on the brake malfunction indicating lamp $L_2$. Thus, the driver can read the indication that the braking oil pressure is at an abnormal level.

Once the SCR is rendered conductive, it can have its conductivity maintained because a maintaining current is supplied from the power source B to the SCR Q via the resistor $R_2$ (where the brake warning switch $SW_2$ is conductive with the brake pedal being released) even if the gate current is blocked out as a result of the nonconductivity of the stop switch $SW_1$ with the brake pedal being released. While, therefore, the ignition switch $SW_3$ is kept conductive, the brake malfunction indicating lamp $L_2$ continues lighting to indicate that the braking oil pressure is at an abnormal level.

When, on the other hand, the ignition switch $SW_3$ is rendered nonconductive, the brake malfunction indicating lamp $L_2$ is turned off, but the SCR Q is maintained conductive because the maintaining current is supplied to the SCR Q via the resistor $R_2$. As a result, when the ignition switch $SW_3$ is rendered conductive again, the brake malfunction indicating lamp $L_2$ is turned on at once independently of the conductivity of the stop switch $SW_1$. Thus, even if another driver takes the place of the foregoing driver, he can recognize at once that the braking oil pressure is at an abnormal level.

After the braking oil pressure again resumes the normal level, the SCR Q will be turned off to extinguish the brake malfunction indicating lamp $L_2$ when the brake warning switch $SW_2$ is rendered nonconductive by depressing the brake pedal.

Figure 3:
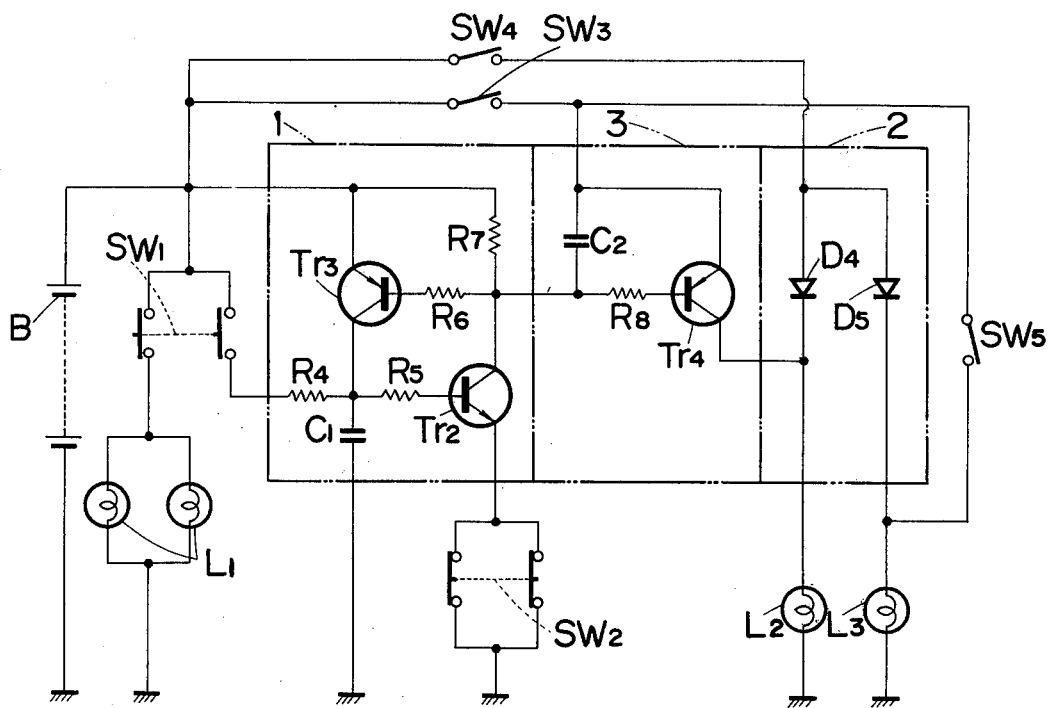
FIG. 3 is also similar to FIG. 1 but shows a further embodiment of the present invention.

Another mode of the brake malfunction warning and indicating system according to the present invention will now be described with reference to FIG. 3, in which like reference numerals and letters will indicate like elements or parts of FIGS. 1 and 2. In this embodiment, however, the following modifications are made. The reference numeral indicates the self-maintaining circuit which is composed of transistors $Tr_2$ and $Tr_3$, resistors $R_4$ to $R_7$ and a capacitor $C_1$. The check circuit 2 is composed of diodes $D_4$ and $D_5$. Another reference numeral 3 indicates an indication circuit which is composed of a transistor $Tr_4$, a resistor $R_8$ and a capacitor $C_2$.

The operation of this embodiment will now be described in the following.

When the ignition switch $SW_3$ and the starter switch $SW_4$ are turned on to start the engine under consideration, the brake malfunction indicating lamp $L_2$ and the parking lamp $L_3$ are also turned on for lighting during the time period while the starter switch $SW_4$ is kept conductive. This is because the two lamps $L_2$ and $L_3$ are supplied with electric energy from the power source B via the starter switch $SW_4$ and via the diodes $D_4$ and $D_5$. The disconnection or breaking of the two lamps $L_2$ and $L_3$ can accordingly be checked.

When, on the other hand, the parking switch $SW_5$ is rendered conductive by application of the side brake while the ignition switch $SW_3$ is conductive, then an electric energy is supplied from the power source B to the parking lamp $L_3$ via the ignition switch $SW_3$ and the parking switch $SW_5$, so that the parking lamp $L_3$ is turned on.

Next, an explanation of the operation will be made as to the case where the brake pedal is depressed to close the stop switch $SW_1$ when the vehicle is running.

Let it be assumed here that the brake pedal is depressed to open the brake warning switch $SW_2$ when the braking oil pressure is at a normal level. Then, the closing of the stop switch $SW_1$ will result in providing connection of the stop lamp $L_1$ with the power source B via the switch $SW_1$, so that the stop lamp $L_1$ is turned on.

In the meantime, the transistor $Tr_2$ has its base connected to and biased by the power source B via the resistors $R_4$ and $R_5$, but it has its emitter disconnected from the ground since the brake warning switch $SW_2$ is non-conductive, so that it is maintained nonconductive. With this transistor $Tr_2$ being nonconductive, therefore, the base potential of the transistor $Tr_4$ (or the collector potential of the transistor $Tr_2$) is elevated to the voltage of the power source B, thus maintaining the nonconductive condition of the transistor $Tr_4$. As a result, the brake malfunction indicating lamp $L_2$ is not turned on, which in turn indicates that the brake system is working under a normal condition.

Now, description will follow in the case where the brake warning switch $SW_2$ is kept conductive even if the brake pedal is depressed, since the braking oil pressure is at an abnormal level. In this instance, the stop lamp $L_1$ is also turned on in the same manner as has been described above. A base bias having its time constant determined both by the resistor $R_4$ and the capacitor $C_1$ is impressed on the transistor $Tr_2$, when the brake warning switch $SW_2$ is conductive, so that the transistor $Tr_2$ is rendered conductive. With this transistor $Tr_2$ being conductive, the base potential of the transistor $Tr_3$ (or the collector potential of the transistor $Tr_2$) is lowered to permit the base current to pass therethrough. As a result, the collector current can pass through the transistor $Tr_3$, and after that this collector current is supplied to the transistor $Tr_2$ via the resistor $R_5$, so that the base potential of the latter transistor $Tr_2$ will accordingly be elevated. This will be accompanied by an abrupt increase in the collector current of the transistor $Tr_2$. Once the self-maintaining circuit 1 receives a trigger signal from the stop switch $SW_1$ under this condition, it is subjected to such a positive feed-back as it experienced in the Schmidt circuit, so that it is rendered conductive all at once. Once, moreover, the self-maintaining circuit 1 is rendered conductive, it will self-maintain its conductive condition until the brake warning switch $SW_2$ is rendered nonconductive, even if the stop switch $SW_1$ is rendered nonconductive. This is because the collector current of the transistor $Tr_3$ continues flowing into the base of the transistor $Tr_2$ through the resistor $R_5$. It should be noted here that since the brake warning switch $SW_2$ is kept closed when the brake pedal is released, it continues its conductive condition irrespective of the condition of the stop switch $SW_1$. Therefore, when the self-maintaining circuit 1 is conductive, the base potential of the transistor $Tr_4$ is lowered so that the transistor $Tr_4$ is rendered conductive to energize the brake malfunction indicating lamp $L_2$ for lighting. In view of the lighting lamp $L_2$, the driver can understand that some trouble exists in the brake system. This lighting will continue until the ignition switch $SW_3$ is rendered nonconductive.

Even if, however, the ignition switch $SW_3$ is rendered nonconductive, the self-maintaining circuit 1 can memorize or maintain its conductive condition. As a result, when the ignition switch $SW_3$ is closed again, the brake malfunction indicating lamp $L_2$ will be quickly turned on independently of the condition of the stop switch $SW_1$. Thus, another driver can recognize later that the braking oil pressure is at an abnormal level.

The reason why the time constant circuit composed of the resistor $R_4$ and the capacitor $C_1$ is provided in the self-maintaining circuit 1 is that, since the brake warning switch $SW_2$ is normally closed with the brake pedal being released but it is rendered nonconductive when the brake pedal is so depressed as to have a normal pressure level of the braking oil, there is a time period differential between the instant when the stop switch $SW_1$ is closed as a result of depression of the brake pedal and the instant when the brake warning switch $SW_2$ is opened. In other words, without such time delay, the brake malfunction indicating lamp $L_2$ will be turned on for a short time period even when the braking oil pressure is at a normal level.

The above indicating circuit employs transistors as its constituent elements, but it should be understood that the transistors may be replaced by relays.

Figure 4:
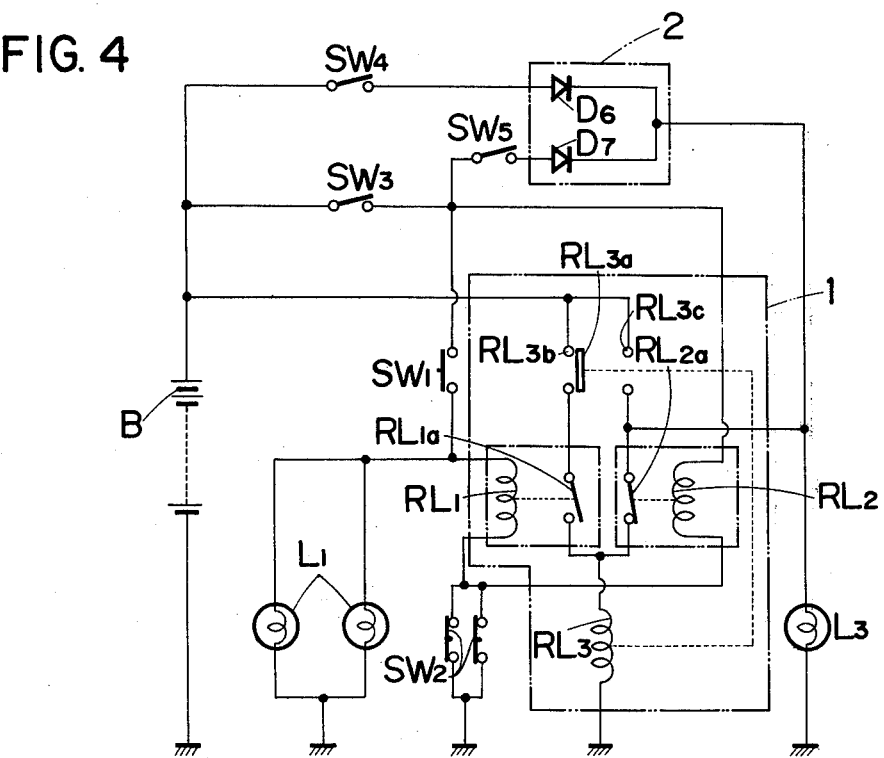
FIG. 4 is also similar to FIG. 1 but shows a further embodiment of the present invention.

Another embodiment of the present invention will be described with reference to FIG. 4, in which like reference numerals and letters will indicate like elements and parts of the afore-mentioned embodiments. In this embodiment, reference letters $SW_5$ and $SW_2$ respectively indicate a parking switch, which is manually closed when it is intended to park the automotive vehicle at night, and a pressure switch $SW_2$ which is provided in the dual systems and adapted to be rendered nonconductive, when the braking oil pressure is at a normal level with the brake pedal being depressed, and rendered nonconductive when the braking oil pressure is at an abnormal level or when the brake pedal is released. Reference numerals $L_1$ and $L_3$ respectively indicate a stop lamp and a parking lamp which also acts as a warning lamp which is turned on when the braking oil pressure is at an abnormal level. Reference letters $RL_1$ and $RL_2$ respectively indicate first and second relays which have their respective one end connected to the ignition switch $SW_3$ and to the stop switch $SW_1$ and their respective other end connected commonly to the pressure switch $SW_2$. The first and the second relays $RL_1$ and $RL_2$ have respectively a normally open contact $RL_{1a}$ and a normally closed contact $RL_{2a}$. Reference numeral $RL_3$ indicates a latching relay having its movable strip $RL_{3a}$ moving between the two contacts $RL_{3b}$ and $RL_{3c}$ when it is energized. The latching relay $RL_3$ has its one end connected to the contacts $RL_{1a}$ and $RL_{2a}$ of the relays $RL_1$ and $RL_2$ and its other end earthed to the ground. Reference letters $D_6$ and $D_7$ indicate diodes for preventing backward flow.

The operation of the above circuit will be described in the following.

When the ignition switch $SW_3$ is closed with the parking switch $SW_5$ being closed, the warning lamp $L_3$ is turned on. Then, the driver can inspect whether or not the warning lamp $L_3$ is in order. Since the stop switch $SW_1$ is nonconductive under this condition, the first relay $RL_1$ is kept deenergized. On the contrary, the second relay $RL_2$ is energized since the pressure switch $SW_2$ is closed. However, the contact $RL_{2a}$ of the second relay $RL_2$ is turned off, and the latching relay $RL_3$ has its movable strip $RL_{3a}$ placed in contact with the contact $RL_{3b}$, so that the latching relay $RL_3$ is nonconductive.

Thereafter, the parking switch $SW_5$ is turned off and the starter switch $SW_4$ is closed to start the engine running. In this instance, the operation of the case, where the brake pedal is depressed with the ignition switch $SW_3$ being closed, will be explained in the following.

Since, in this instance, the pressure switch $SW_2$ is nonconductive when the hydraulic circuit of the brake system is working under a normal condition, the first relay $RL_1$ is kept deenergized, even when the stop switch $SW_1$ is closed, and the second relay $RL_2$ is also kept deenergized. As a result, the latching relay $RL_3$ is nonconductive so that the warning lamp $L_3$ is not turned on.

When, on the contrary, a malfunction takes place in the hydraulic circuit in the brake system, the depression of the brake pedal will cause closure of, for example, the pressure switch $SW_2$. As a result, the first relay $RL_1$ is energized to close the normally open contact $RL_{1a}$, so that the latching relay $RL_3$ is energized to bring the movable strip $RL_{3a}$ into contact with the contact $RL_{3c}$. This causes simultaneous lighting of the warning lamp $L_3$. In this way, the driver can recognize that the braking oil pressure is at an abnormal level. Even if the brake pedal is released under this particular condition, the pressure switch $SW_2$ will maintain its conductive condition, so that an electric current will continue flowing through the first and second relays $RL_1$ and $RL_2$. As a result, the normally open contact $RL_{1a}$ will be closed, whereas the normally closed contact $RL_{2a}$ will be kept open. With the contact $RL_{2a}$ being kept open, therefore, the latching relay $RL_3$ is deenergized to have its movable strip $RL_{3a}$ in contact with the contact $RL_{3c}$, so that the warning lamp $L_3$ will continue lighting.

Even if the ignition switch $SW_3$ is closed again, the pressure switch $SW_2$ will be closed irrespective of the depressed condition of the brake pedal, so that the second relay $RL_2$ is energized to open the normally closed contact $RL_{2a}$. As a result, the latching relay $RL_3$ is kept deenergized to keep the movable strip $RL_{3a}$ in contact with the contact $RL_{3c}$, so that the warning lamp $L_3$ is turned on. More specifically, once a malfunction occurs in the hydraulic circuit of the brake system, the warning lamp $L_3$ can be turned on again when the ignition switch $SW_3$ is closed again after it has been opened. In this way, the warning lamp $L_3$ can continue warning that the braking oil pressure is at an abnormal level.

When, on the other hand, the brake pedal is depressed after the malfunction of the hydraulic circuit is repaired to obtain a normal level of the braking oil pressure, the pressure switch $SW_2$ is rendered nonconductive to block out an electric current to be supplied to the first and the second relays $RL_1$ and $RL_2$. As a result, the normally closed contact $RL_{2a}$ of the second relay $RL_2$ is closed to allow an electric current to pass through the latching relay $RL_3$, and the movable contact $RL_{3a}$ is moved into contact with the contact $RL_{1a}$. Since, at this particular instant, the contact $RL_{1a}$ of the first relay $RL_1$ is kept open, the latching relay $RL_3$ will not be energized again. And, the changeover of the contact of the latching relay $RL_3$ will block out the current supply to the warning lamp $L_3$.

In the embodiment under discussion, moreover, the opening and closing operation of the pressure switch $SW_2$ is carried out by the use of the first and the second relays $RL_1$ and $RL_2$. However, this operation can be made by alternatively resorting to semi-conductive switching elements such as transistors. This can be accomplished by a transistor which has its collector and emitter connected between the contacts $RL_{1a}$ and $RL_{2a}$ of the relays $RL_1$ and $RL_2$ and its base connected to the pressure switch $SW_2$.

Although the above description of the present embodiment has been limited to that where only one of the pressure switches $SW_2$ detects a malfunction of the brake system, the other or both of the switches $SW_2$ may likewise perform the same operation for the same purpose.

As has been described hereinbefore, a safer and more reliable brake malfunction warning and indicating system is proposed according to the present invention, which comprises a brake warning switch rendered conductive either when a brake pedal is depressed with the braking oil pressure being at an abnormal level or when the brake pedal is released, a self-maintaining circuit connected to said brake warning switch and rendered conductive, only when said brake warning switch is conductive, for self-maintaining its conductive condition, and an indicating circuit connected to said self-maintaining circuit and rendered conductive, when said self-maintaining circuit is conductive, for turning on a brake malfunction indicating lamp. Thus, it should be appreciated that the indicating lamp will continue lighting, while the braking oil pressure is at an abnormal level, until the pressure is restored to a normal level.

What is claimed is:

1. A brake malfunction warning and indicating system for use with a brake system of an automotive vehicle, said brake system having a brake pedal and working fluid under pressure therein, said warning and indicating system comprising a power source, a stop switch connected to said source adapted to close in response to the depression of the brake pedal, a stop lamp connected through said stop switch to the power source, a brake warning switch normally closed when the brake pedal is released, but adapted to open when the brake pedal is depressed and the pressure of the working fluid in the brake system is at a normal level and to remain closed in response to a possible malfunction of the brake system in terms of the working fluid when the brake pedal is depressed, a controlled rectifying element having an anode and cathode connected between said brake warning switch and an anode of said power source, and at its gate to said stop switch, an indicating means connected at one end to the anode of said controlled rectifying element and at the other end through an ignition switch to the anode of said power source, a starter switch connected to said power source, and a switching means turned ON when said starter switch is closed, rendering the indicating means conductive through said ignition switch.

* * * * *